United States Patent
Murasawa et al.

(10) Patent No.: US 11,057,528 B2
(45) Date of Patent: Jul. 6, 2021

(54) INFORMATION PROCESSING APPARATUS, METHOD AND STORAGE MEDIUM

(71) Applicant: CANON KABUSHIKI KAISHA, Tokyo (JP)

(72) Inventors: Kouta Murasawa, Yokohama (JP); Okinori Tsuchiya, Yokohama (JP); Yugo Mochizuki, Kawasaki (JP); Tatsuhiro Yamagata, Inagi (JP); Toshiki Miyazaki, Tokyo (JP); Masao Kato, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/575,809

(22) Filed: Sep. 19, 2019

(65) Prior Publication Data

US 2020/0101728 A1  Apr. 2, 2020

(30) Foreign Application Priority Data

Sep. 27, 2018 (JP) .............................. JP2018-182954
Aug. 6, 2019 (JP) .............................. JP2019-144469

(51) Int. Cl.
*B41J 2/045* (2006.01)
*H04N 1/00* (2006.01)

(52) U.S. Cl.
CPC ...... *H04N 1/00045* (2013.01); *B41J 2/04508* (2013.01); *B41J 2/04593* (2013.01); *H04N 1/00031* (2013.01); *H04N 1/00087* (2013.01); *H04N 1/00724* (2013.01); *H04N 1/00726* (2013.01); *H04N 1/00753* (2013.01)

(58) Field of Classification Search
CPC .............. B41J 2/04508; B41J 2/04593; H04N 1/00724; H04N 1/00726; H04N 1/00753; H04N 1/00045; H04N 1/00031; H04N 1/00087

See application file for complete search history.

(56) References Cited

U.S. PATENT DOCUMENTS

| | | | |
|---|---|---|---|
| 2012/0050363 A1* | 3/2012 | Nagashima | B41J 2/0593 |
| 2012/0206746 A1* | 8/2012 | Sakatani | H04N 1/00023 358/1.9 |
| 2012/0250054 A1* | 10/2012 | Mitsuhashi | H04N 1/4092 358/1.13 |
| 2013/0135686 A1* | 5/2013 | Abe | H04N 1/6055 358/406 |
| 2016/0134782 A1* | 5/2016 | Yamamuro | H04N 1/605 358/1.9 |

FOREIGN PATENT DOCUMENTS

JP  2015-015589 A  1/2015

* cited by examiner

*Primary Examiner* — Moustapha Diaby
(74) *Attorney, Agent, or Firm* — Venable LLP

(57) ABSTRACT

An information processing apparatus performs processing for putting a width of a line in an output in a case where printing is performed by a first printing apparatus based on print data including a line close to a width of a line in an output in a case where printing is performed by a second printing apparatus based on the print data. A first acquisition unit is configured to acquire first information relating to an output in a case where printed matter including a plurality of line width detection images is printed by the second printing apparatus.

18 Claims, 16 Drawing Sheets

| SHEET TYPE | PRINT QUALITY | PRINT HEAD SPEED |
|---|---|---|
| PLAIN PAPER | FAST | 60 inch/s |
| PLAIN PAPER | STANDARD | 50 inch/s |
| PLAIN PAPER | CLEAR | 40 inch/s |
| . . . | . . . | . . . |

Fig.15A

| SHEET TYPE | RATE OF CHANGE |
|---|---|
| COATED PAPER | 1.4 |
| PLAIN PAPER | 1.0 |
| TRANSLUCENT PAPER | 0.9 |
| . . . | . . . |

Fig.15B

| PRINT HEAD SPEED | RATE OF CHANGE (MAIN SCANNING DIRECTION) | RATE OF CHANGE (SUB SCANNING DIRECTION) |
|---|---|---|
| 60 inch/s | 2.4 | 1.7 |
| 50 inch/s | 2.8 | 1.4 |
| 40 inch/s | 2.4 | 1.2 |
| . . . | . . . | . . . |

Fig.15C

IMAGE IN WHICH LINES ADHERE TO EACH OTHER (PRINTING APPARATUS)

| | (1) | (2) | (3) | (4) |
|---|---|---|---|---|
| (1) | 0 | -0.105 | -0.210 | -0.315 |
| (2) | + 0.105 | 0 | -0.105 | -0.210 |
| (3) | + 0.210 | + 0.105 | 0 | -0.105 |
| (4) | + 0.315 | + 0.210 | +0.105 | 0 |

(row header, left side: IMAGE IN WHICH LINES ADHERE TO EACH OTHER (TARGET PRINTING APPARATUS))

Fig.16

INFORMATION PROCESSING APPARATUS, METHOD AND STORAGE MEDIUM

BACKGROUND OF THE INVENTION

Field of the Invention

The present disclosure relates to a technique to match outputs between printing apparatuses.

Description of the Related Art

In a case where a drawing is printed, line width information is very important information for a user to read information from the drawing (referred to as drawing information). For example, an external shape line is represented by a thick line and a dimension line or a leader line is represented by a thin line. However, because of a variety of factors of a printer (also referred to as printing apparatus), the line width is different for different printing apparatuses, and therefore, in a case where printing is performed by using a different printing apparatus, printing is performed with a different line width and there is a possibility that a user erroneously recognizes drawing information.

On the other hand, there is a printing apparatus including a line width adjustment function in order to adjust a change in line width due to variation factors of the printing apparatus itself. In many cases, the function such as this is designed as a correction function relating to the variation factors of its own model. Japanese Patent Laid-Open No. 2015-015589 has disclosed a line width adjustment function to uniformly increase the line width by manually inputting the number of pixels for increasing the line width.

In a case where line widths are matched between different printing apparatuses by using the method described in Japanese Patent Laid-Open No. 2015-015589, printing is performed by repeating changing of the line width adjustment value so as to match the line width with that of the target printing apparatus and a user determines a line width adjustment value that matches best by making a visual comparison.

SUMMARY OF THE INVENTION

However, with the method described in Japanese Patent Laid-Open No. 2015-015589, the line width adjustment value is determined by repeatedly making a visual comparison, and therefore, this will be a very troublesome work for a user.

Consequently, in view of the above-described problem, an object of the present disclosure is to enable a user to easily set a line width adjustment value in a case where line widths are matched between different printing apparatuses.

One embodiment of the present invention is an information processing apparatus that performs processing for putting a width of a line in an output in a case where printing is performed by a first printing apparatus based on print data including a line close to a width of a line in an output in a case where printing is performed by a second printing apparatus based on the print data, the information processing apparatus including: a first acquisition unit configured to acquire first information relating to an output in a case where printed matter including a plurality of line width detection images is printed by the second printing apparatus, in each of which a plurality of lines having a predetermined width in a first direction and extending in a second direction intersecting the first direction is provided at regular intervals in the first direction and in which an interval between two lines adjacent in the first direction is different from one another; a second acquisition unit configured to acquire second information indicating a relationship between a width of a line in predetermined print data and a width of a line in printed matter that is printed by the first printing apparatus based on the predetermined print data; and a determination unit configured to determine an adjustment value for adjusting a width of a line, which is used in a case where data that is printed by the first printing apparatus is processed, based on the first information and the second information.

Further features of the present invention will become apparent from the following description of exemplary embodiments with reference to the attached drawing.

BRIEF DESCRIPTION OF THE DRAWINGS

FIG. 15A to FIG. 15C are tables used for determining the rate of change in line width adjustment value in the second embodiment; and FIG. 16 is a table used in the first embodiment.

DESCRIPTION OF THE EMBODIMENTS

In the following, with reference to the drawings, preferred embodiments of the present invention are explained in detail. However, contents described in the following are merely exemplary and not intended to limit the scope of the present invention only to those.

First Embodiment

Figure 1:
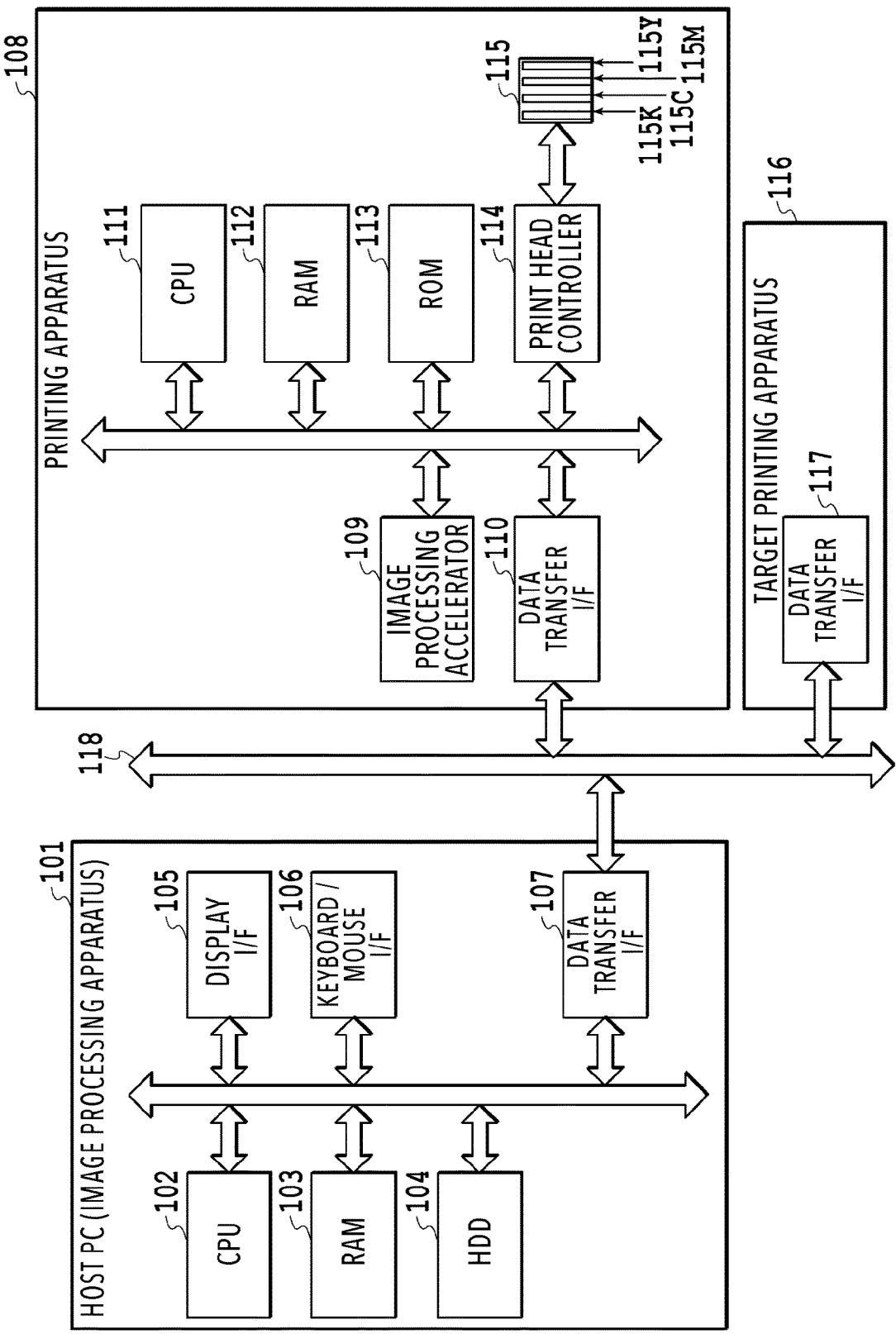
FIG. 1 is a block diagram showing a configuration of a printing system in a first embodiment.

FIG. 1 is a block diagram explaining the configuration of a printing system in the present embodiment. As shown in FIG. 1, the printing system has a host PC (called an image processing apparatus, an information processing apparatus, and the like) 101, a first printing apparatus 108, and a second printing apparatus 116. The second printing apparatus 116 is a printing apparatus that is a target in a case where a line width is matched, and therefore, called the target printing apparatus 116.

The image processing apparatus 101 is specifically a host PC, a tablet PC, and the like. In the image processing apparatus 101, a CPU 102 performs various kinds of processing in accordance with programs stored in an HDD 104 by using a RAM 103 as a work area. For example, the CPU 102 receives a command corresponding to instructions a user inputs by using a touch panel (not shown schematically) via a keyboard/mouse interface 106 (hereinafter, interface is abbreviated to I/F). Then, the CPU 102 generates image data that the printing apparatus 108 can print in accordance with the received command or the programs stored in the HDD 104 and transmits the generated image data to the printing apparatus 108.

Further, the image processing apparatus 101 (CPU 102) performs predetermined processing in accordance with the programs stored in the HDD 104 for the image data received from the printing apparatus 108 via a data transfer I/F 107. The CPU 102 displays a variety of pieces of information, such as the processing results, on a display, not shown schematically, via a display I/F 105. It is possible for the image processing apparatus 101 (CPU 102) to perform the same processing as the processing for the printing apparatus 108 described previously also for the target printing apparatus 116.

On the other hand, in the printing apparatus 108, a CPU 111 performs various kinds of processing in accordance with programs stored in a ROM 113 by using a RAM 112 as a work area. Further, the printing apparatus 108 includes an image processing accelerator 109 for performing high-speed image processing. The image processing accelerator 109 is hardware capable of performing image processing at a speed higher than that of the CPU 111. The image processing accelerator 109 is activated by the CPU 111 writing parameters and data necessary for image processing to a predetermined address. After reading the parameters and data written to the RAM 112, the image processing accelerator 109 performs predetermined image processing for the data. The image processing accelerator 109 is not an indispensable component and it may also be possible for the CPU 111 to perform the same processing without the printing apparatus 108 including the image processing accelerator 109. Further, the parameters that are written to the RAM 112 may be stored in the ROM 113 or stored in a storage (not shown schematically), such as a flash memory and an HDD.

Here, the predetermined image processing performed by the CPU 111 or the image processing accelerator 109 is explained. The predetermined image processing is processing to modify input print data into data indicating the dot formation position of ink in each scan and includes color conversion processing and quantization processing for the input print data. Color conversion is processing to convert the input print data into data of ink colors handled by the printing apparatus. For example, in a case where image data included in the input print data indicates an image by color space coordinates, such as sRGB, which are the representation colors of a monitor, the sRGB image data (that is, image data in which each pixel has a color value of each of RGB) is converted into image data of the ink colors handled by the printing apparatus. The "image data of the ink colors handled by the printing apparatus" in this example is image data in the bitmap format, in which each pixel has a color value of each of KCMY. In the present specification, red, green, and blue are represented respectively by one letter as R, and B and similarly, each ink color is represented by one letter, specifically, black is represented by K, cyan by C, magenta by M, and yellow by Y.

The color conversion described previously is implemented by using an already-known method, such as matrix calculation processing and processing using a three-dimensional LUT. As described previously, the printing apparatus 108 of the present embodiment uses inks of four colors (that is, KCMY), and therefore, the image data of the RGB signal is converted into image data including an 8-bit color signal of each of K, C, M, and Y. The value of the color signal of each ink color corresponds to the amount of each ink to be given. As the inks to be used, the four color inks of K, C, M, and Y are enumerated as an example, but it may also be possible to use other inks, such as inks of light cyan (Lc), light magenta (Lm), and gray (Gy), whose density is low in order to improve image quality. In such a case, a color signal in accordance with the ink to be used is generated.

After the color conversion processing, quantization processing is performed for the image data having the ink color signal. This quantization processing is processing to reduce the number of levels of tones of the image data. In the present embodiment, quantization is performed by using a dither matrix in which threshold values for comparing with the value of image data for each pixel are arrayed. Through the quantization processing such as this, finally, binary data indicating whether or not to form a dot at each dot formation position is generated. In a case where printing is performed by a multi-pass method, in order to generate data for a thinned image corresponding to a scan of each time, processing to thin the image is performed for the data after the quantization processing by using a mask pattern, and the like.

After the predetermined image processing is completed, the print data is transmitted to a print head 115 by a print head controller 114. At the same time, the CPU 111 drives the carriage motor to cause the print head 115 to operate and further drives the conveyance motor also for conveying paper. Due to this, the print head 115 ejects ink onto the paper surface while scanning on the paper, and as a result, an image is formed on the paper. The print head 115 has a nozzle column 115K ejecting K ink, a nozzle column 115C ejecting C ink, a nozzle column 115M ejecting M ink, and a nozzle column 115Y ejecting Y ink.

In the print head 115, in a case where ink is ejected from one ejection hole (also referred to as nozzle), ink is ejected as a plurality of ink droplets because of the influence of the surface tension of the ink. In the present specification, it is assumed that the print head performs a scan along the direction intersecting the direction in which each nozzle column extends, and this direction is called the main scanning direction. On the other hand, the direction in which paper is conveyed is called the sub scanning direction. It is assumed that the definition of the main scanning direction and the sub scanning direction is common to the printing apparatus 108 and the target printing apparatus 116.

Figure 2:
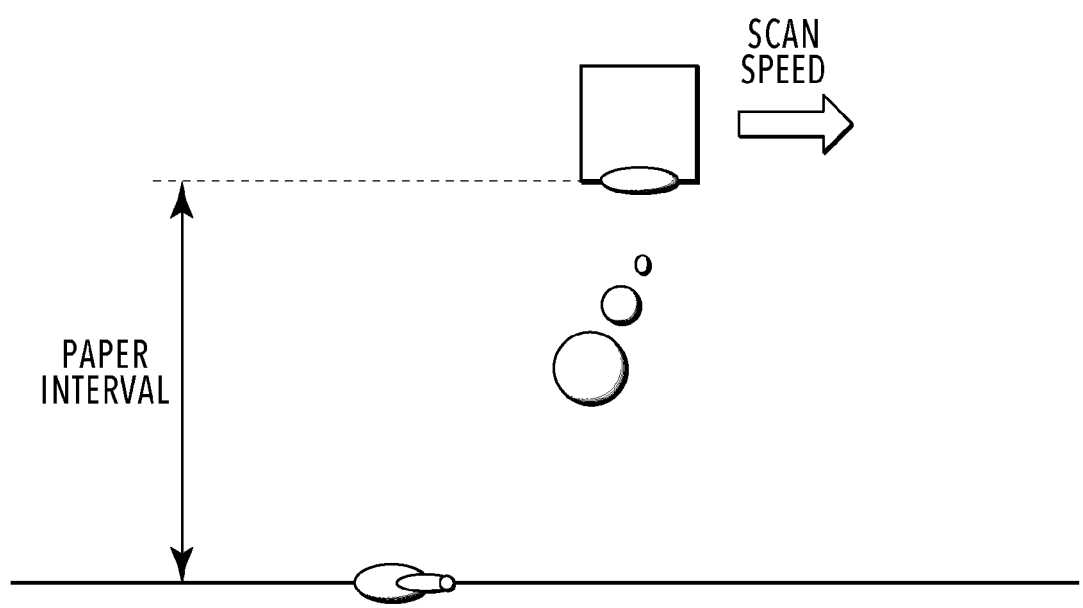
FIG. 2 is a diagram showing a relationship between a scan of a print head and landing of an ink droplet including a satellite.

In the present specification, of the ink droplets that reach paper, the largest ink droplet is described as a main droplet and the ink droplet other than this is described as a satellite. The number of satellites is not limited to one and there is a case where two or more satellites are formed. The positions at which the main droplet and the satellite land are determined mainly by the scan speed of the print head (hereinafter, simply described as "scan speed") and the distance between the print head and the paper as shown in FIG. 2.

The image processing apparatus 101 is connected with the printing apparatus 108 and the target printing apparatus 116 via the communication line 118. However, the printing apparatus 108 and the target printing apparatus 116 do not need to be connected at the same time with the image processing apparatus 101 at all times and may be disconnected as needed. In this example, explanation is given on the assumption that the target printing apparatus 116 is an ink jet printer, but the target printing apparatus may be a printing apparatus, such as a laser beam printer, a copy machine, and an LED plotter. Further, in this example, explanation is given on the assumption that the communication circuit 118 is Ethernet (registered trademark), but the communication circuit may be a USB hub, a wireless communication network using a wireless access point, and a connection using the WiFi Direct communication function.

<About Occurrence Factor of Change in Line Width Characteristic>

Figure 3:
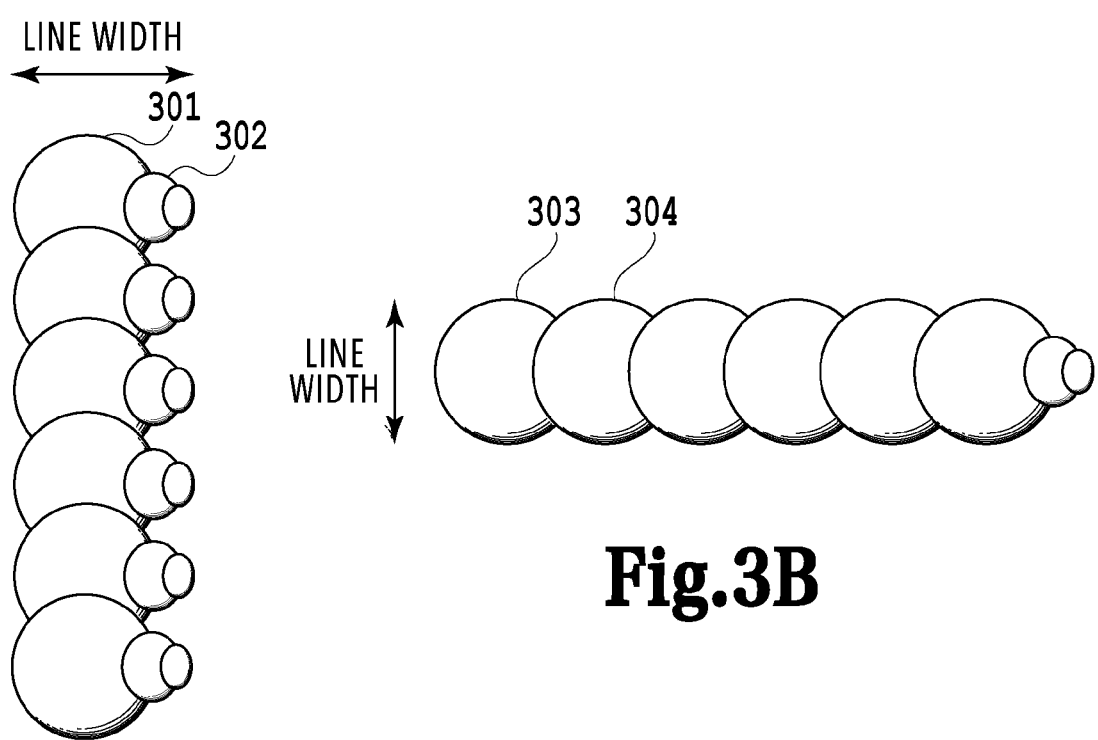
FIG. 3A and FIG. 3B are each a diagram showing a relationship between the orientation of a line and the line width.

In the following, the occurrence factor of a change in the line width characteristic is explained. FIG. 3A and FIG. 3B are diagrams schematically showing a change in the line width resulting from a shift between the landing position of the main droplet and the landing position of the satellite. FIG. 3A is a diagram showing the results of printing a line extending along the sub scanning direction and FIG. 3B is a diagram showing the results of printing a line extending along the main scanning direction. In the line shown in FIG. 3A, a main droplet 301 and a satellite 302 are in a lateral configuration and the line width is greater than the diameter of the main droplet. In contrast to this, in the line shown in FIG. 3B, a main droplet 304 lands on a satellite of a main droplet 303, and as a result, the satellite of the main droplet 303 is not seen on the surface. Consequently, the line width of the line shown in FIG. 3B is the same as the diameter of the main droplet 303. As described above, even in a case where lines of equal line width are printed on the paper surface, the line extending along the sub scanning direction is printed thicker than the line extending along the main scanning direction.

Figure 4:
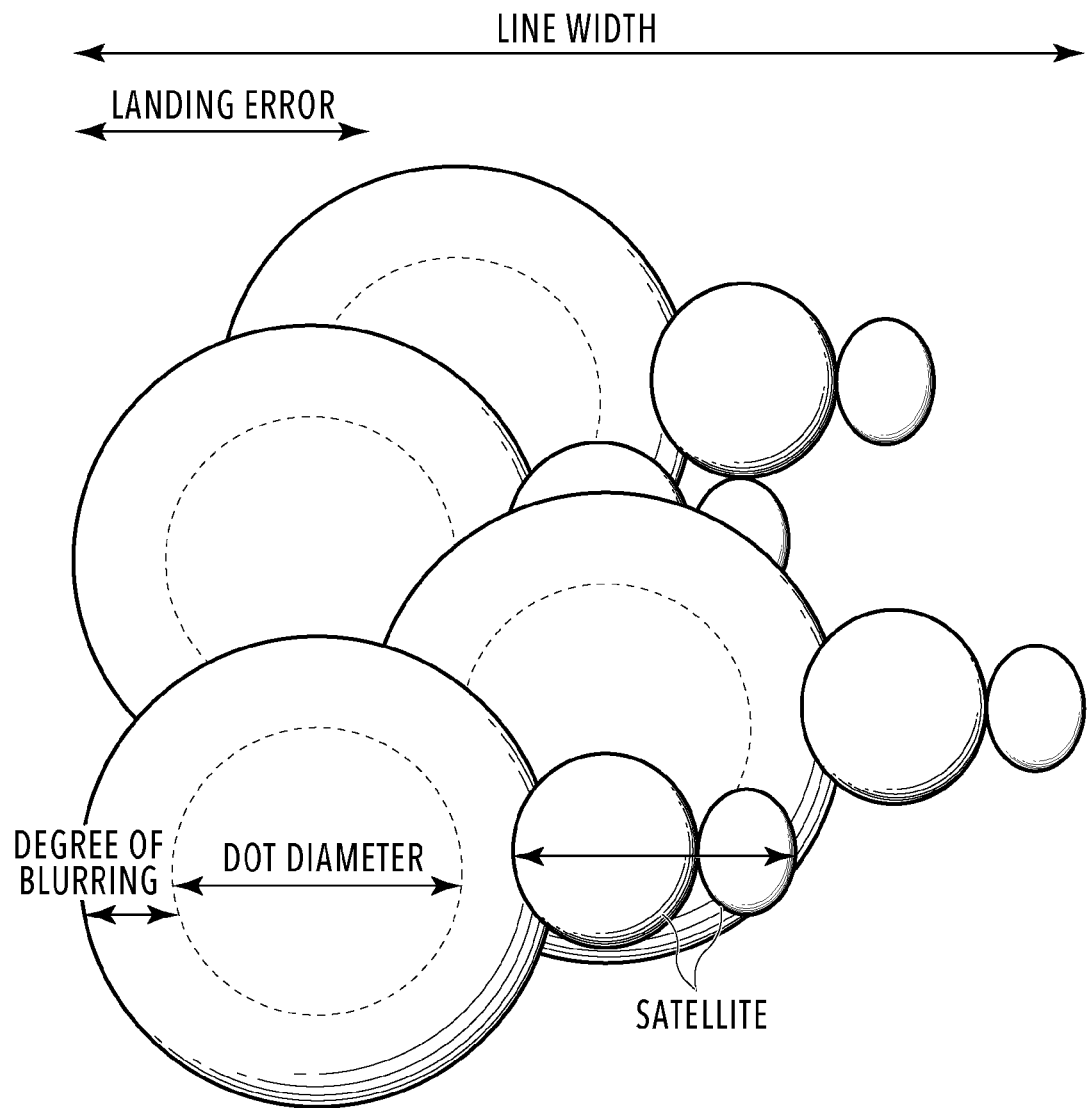
FIG. 4 is a diagram showing a factor that changes a line width.

There are other occurrence factors of the change in the line width characteristic. As shown in FIG. 4, as specific occurrence factors, mention is made of the error of the landing position of the main droplet due to a shift in the ink ejection timing and a conveyance shift of paper, and the degree of ink blurring being dependent on the dot diameter of the main droplet on the paper surface, a sheet, and ink, and the like.

<About Processing to Find Line Width Adjustment Value>

In the following, processing to find a line width adjustment value for matching with the line width of the target printing apparatus 116 in the present embodiment is explained by using FIG. 5.

At step S501, the image processing apparatus 101 transmits the print data including data of the line width detection image to the target printing apparatus 116 and the target printing apparatus 116 prints the line width detection image on a sheet based on the print data transmitted from the image processing apparatus 101. The "line width detection image" is an image for detecting a line width change amount as the line width characteristic of the target printing apparatus 116 by causing the target printing apparatus 116 to perform printing. In the following, "step S-" is simply described as "S-".

Figure 6:
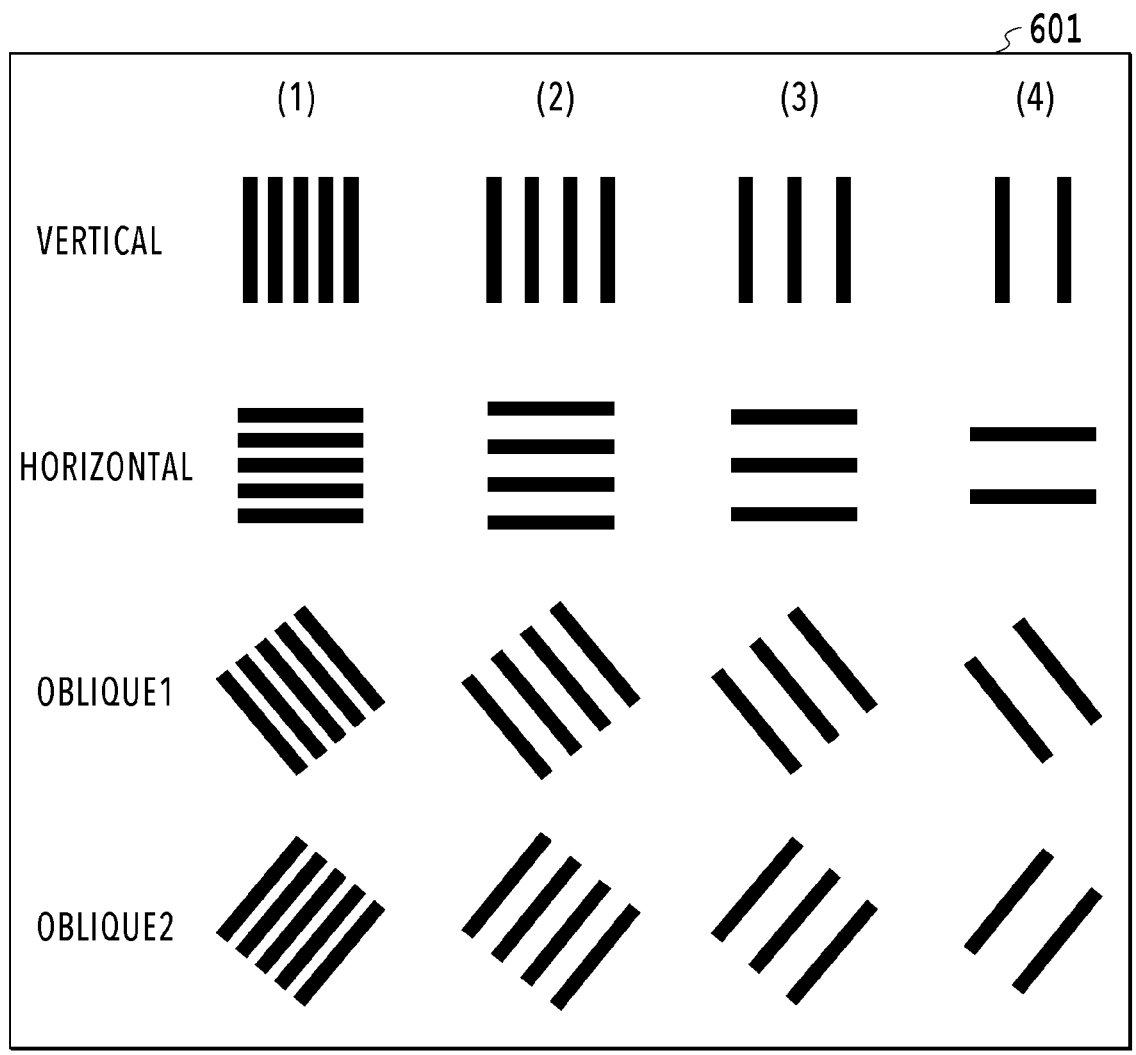
FIG. 6 is a diagram showing a patch image having a plurality of line width detection images in the first embodiment.

Here, the line width detection image is explained by using FIG. 6. FIG. 6 is a diagram showing print image data of an image (referred to as patch image) including a plurality of (in this example, 16) line width detection images. Each line width detection image included in a patch image 601 is an image including a line having a one-pixel width (referred to as one-pixel line) at a resolution of 1,200 dpi and the combination pattern of the line direction and the frequency characteristic is different from one another.

Specifically, a case where image data is vector data is described. In this case, as shown in the row of vertical in FIG. 6, a plurality of line width detection images including a plurality of black lines extending in the vertical direction and whose line width in the horizontal direction is 0.21 mm is included. The plurality of lines of each line width detection image is arranged in the horizontal direction at regular intervals. Then, in each line width detection image, the interval between two lines adjacent to each other in the horizontal direction is different from one another. In the row of vertical in FIG. 6, in the line width detection image of (1), the plurality of lines is arranged with a space of 0.21 mm in between, in the line width detection image of (2), the plurality of lines is arranged with a space of 0.42 mm in between, in the line width detection image of (3), the plurality of lines is arranged with a space of 0.63 mm in between, and in the line width detection image of (4), the plurality of lines is arranged with a space of 0.84 mm in between. As described above, the patch image includes the plurality of line width detection images in which the distance between the two lines adjacent to each other in the horizontal direction in FIG. 6 gradually increases.

In contrast to this, in a case where image data is raster data, the patch image includes images in which the number of pixels of the interval between two adjacent lines gradually increases, such as an image in which one-pixel lines are arranged with an interval of one pixel in between, an image in which one-pixel lines are arranged with an interval of two pixels in between, and so on. By arranging a plurality of line width detection images so that the interval between two adjacent lines increases by one pixel each time between images adjacent to each other in the horizontal direction, it is possible to detect the line width with a high accuracy.

Further, as shown in FIG. 6, the patch image 601 may include a plurality of line width detection images in which lines extending in the vertical direction (vertical lines) are arranged in the form of a stripe in the horizontal direction and a plurality of line width detection images in which lines extending in the horizontal direction (horizontal lines) are arranged in the form of a stripe in the vertical direction. Furthermore, as shown in FIG. 6, the patch image may include a plurality of line width detection images in which lines extending in the oblique direction are arranged in the form of a stripe. As described above, including the line width detection images in which the oblique lines are arranged is effective for the influence of the satellite described previously and it is made possible to detect each line width with a high accuracy for the lines in the main scanning direction and the sub scanning direction, which are affected by the satellite.

Data to be printed includes raster data, such as a bitmap, and vector data. In a case where raster data is compressed by a compression algorithm and the like, decode processing is performed. As the format of compressed data, there are a compression method specified by JPEG (Joint Picture Expert Group), which is irreversible compression, and a compression method of RL (Run Length), which is reversible compression. As the compression method, any already-existing method may be used. In a case where non-compressed data is transferred, it is possible to transfer without deterioration in the image quality. In a case where vector data is transferred, it is possible to transfer without deterioration in the image quality by a data amount smaller than that of non-compressed data, although what can be turned into vector data is limited to a character and the like. Vector data includes the PDL (Page Description Language), printer control code for a drawing, and the like. In this case, it is possible to define the line width as a numerical value. In a case of reversibly compressed raster data and vector data, it is possible to transmit data without degradation, and therefore, it is possible to perform more accurate line width detection.

In a case where the image data is vector data, it is possible to detect also the characteristic of the printing apparatus at the time of converting vector data into raster data on the side of the printing apparatus. For example, in a case where the line width is defined by a numerical value (specifically, number of pixels) in vector data, it is possible to detect a difference, such as whether 1.5 pixels are represented as one pixel by rounding down in the raster data or whether 1.5 pixels are represented as two pixels by rounding up. However, in a case where the difference such as this is detected, it is necessary for the patch image to include a plurality of line width detection images in which the line width is different from one another. For example, a line width detection image in which a plurality of lines whose line width is 0.21 mm is arranged, a line width detection image in which a plurality of lines whose line width is 0.31 mm is arranged, a line width detection image in which a plurality of lines whose line width is 0.41 mm is arranged, and the like.

Figure 5:
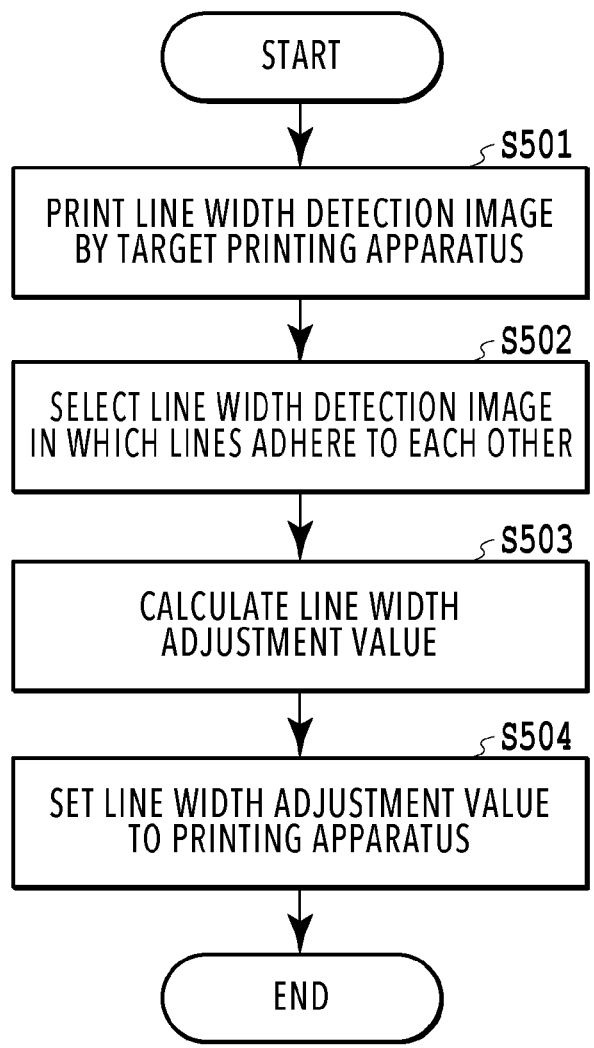
FIG. 5 is a flowchart of processing to find a line width adjustment value in the first embodiment.
Figure 7:
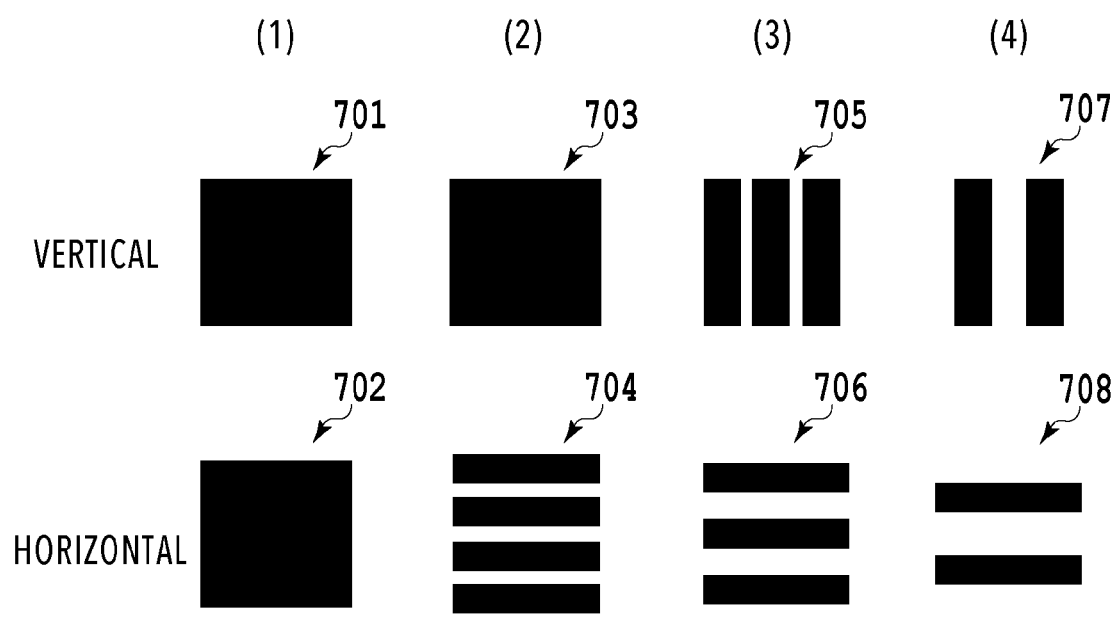
FIG. 7 is a diagram showing printing results of the line width detection images.
Figure 8:
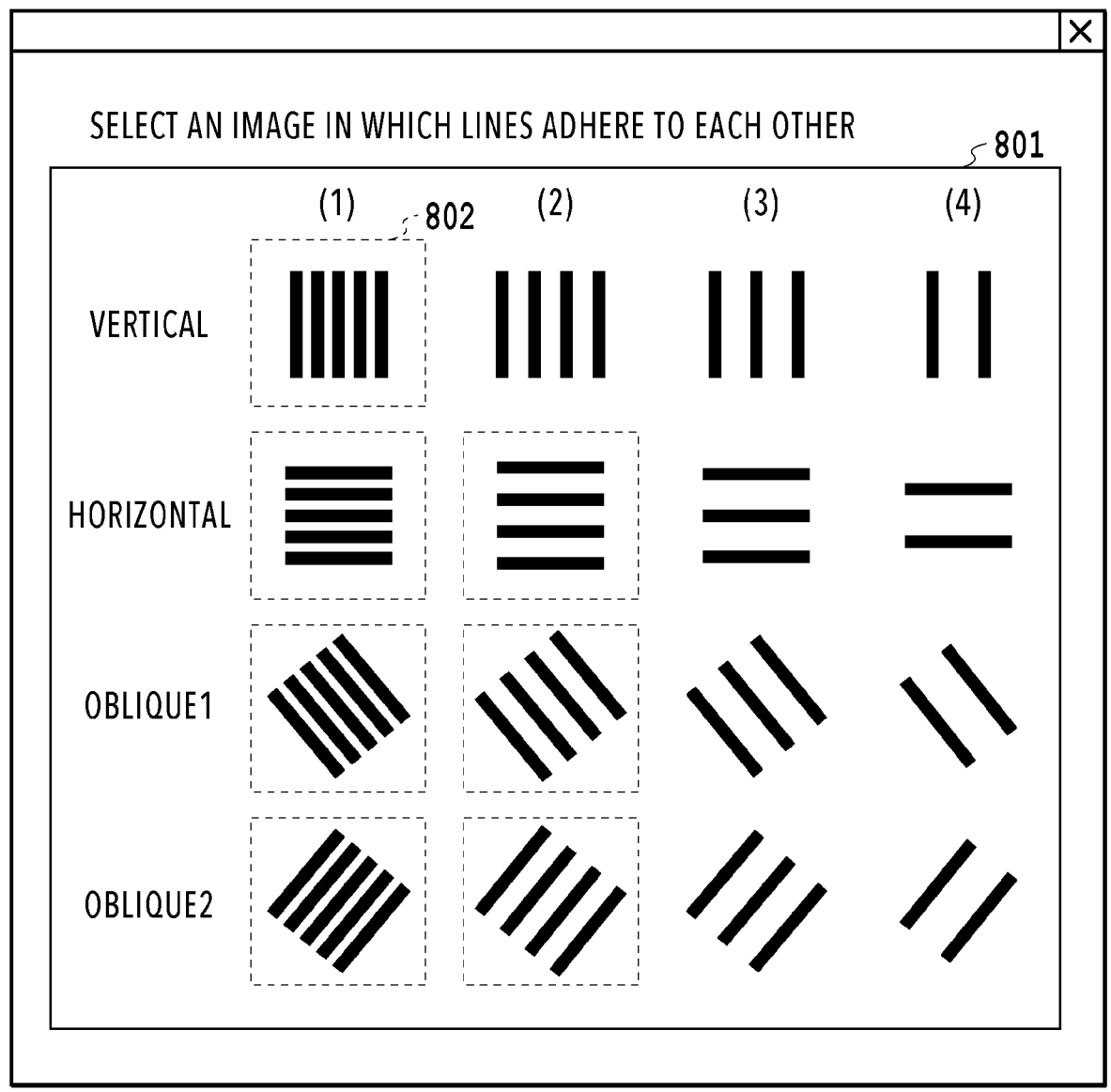
FIG. 8 is a screen that is presented to a user for selecting a line width detection image in the first embodiment.

Explanation is returned to FIG. 5. At S502, by a user selecting a line width detection image in which two adjacent lines adhere to each other and the gap between the lines cannot be recognized visually from among the line width detection images printed at S501, the line width of the line printed by the target printing apparatus 116 is detected. "Adhering to each other" refers to a state where adjacent lines adhere to each other because of a change in the line width and this state where lines adhere to each other is explained by using FIG. 7. FIG. 7 is a diagram showing printed matter in which the patch image is printed. Images 701 to 708 correspond to a plurality of line width detection images in the printed matter. In the image 701 to the image 703, the plurality of arranged lines adheres to one another and in the image 704 to the image 708, the lines do not adhere to one another. Because of this, the images that are selected as images in which the gap between two adjacent lines cannot be recognized visually are the image 701 to the image 703. As one embodiment, the CPU 102 of the image processing apparatus 101 causes the display I/F 105 to display a selection screen 801 as shown in FIG. 8 and a display that prompts a user to select all the images in which the gap cannot be recognized visually. The selection screen 801 in FIG. 8 shows a state where images enclosed by broken lines 802 are selected by a user. The input of information indicating images selected by causing a user to select images as described above is received. By causing a user to select all the images in which the gap cannot be recognized visually, it is known which image is the image in which the interval between two adjacent lines is the largest of the images in which the gap cannot be recognized visually, and therefore, it is made possible to easily set the line width adjustment value. As another embodiment, an aspect is considered in which a number is allocated to each line width detection image and a user inputs the numbers corresponding to the line width detection images in which lines adhere to each other to the image processing apparatus 101 or the printing apparatus 108. Further, the aspect is not limited to the above-described aspect as long as it is possible to acquire information indicating the interval at which two adjacent lines touch each other as information indicating the line width on the printed matter. For example, it may also be possible to produce a display that prompts a user to select one image in which the interval between two adjacent lines is the largest of the images in which the gap cannot be recognized visually. Further, it may also be possible to produce a display that prompts a user to select one image in which the interval between two adjacent lines is the smallest of the images in which the gap can be recognized visually.

At S503, based on the information indicating the image selected at S502, the line width value after the change in the target printing apparatus 116 is estimated and the line width adjustment value of the printing apparatus 108 is determined. The line width value after the change means the line width value of the line on the printed matter printed on a sheet. There is a possibility that the line width of the printed line has changed, for example, from the line width specified in the vector data by the change factor due to processing of the image data for printing and the printing operation. The main entity that performs this step is the image processing apparatus 101 in a case where the input destination at S502 is the image processing apparatus 101 and the printing apparatus 108 in a case where the input destination at S502 is the printing apparatus 108.

In the following, the estimation method of a line width value after printing in the target printing apparatus 116 at S503 is explained by using FIG. 7. The four line width detection images in the "vertical" row, which include vertical lines that are lines in the sub scanning direction corresponding to the direction in which a sheet is conveyed, are referred to. Then, it is known that the lines adjacent in the horizontal direction are in contact with each other in the image 701 obtained by printing the line width detection image in which the lines having a line width of 0.21 mm are arranged with a space of 0.21 mm in between in the image data, and in the image 703 obtained by printing the line width detection image in which the lines having a line width of 0.21 mm are arranged with a space of 0.42 mm in between in the image data. From this, it is possible to estimate that the line having a line width of 0.21 mm in the sub scanning direction on the image data is the line having a line width of 0.63 mm on the printed matter. Further, the four line width detection images in the "horizontal" line, which includes the horizontal lines that are lines in the main scanning direction that is the direction in which the print head scans, are referred to. Then, the adjacent lines adhere to each other in the image 702 obtained by printing the line width detection image in which the lines having a line width of 0.21 mm are arranged with a space of 0.21 mm in between on the image data. From this, it is possible to estimate that the line having a line width of 0.21 mm in the main scanning direction is the line having a line width of 0.42 mm on the printed matter.

Next, the determination method of a line width adjustment value of the printing apparatus 108 at S503 is explained. In order to determine the line width adjustment value at S503, the characteristic relating to the line width of the printing apparatus 108 is acquired. The characteristic relating to the line width of the printing apparatus 108 is an index value about the factor that affects the line width in the processing at the time the printing apparatus 108 performs printing. As an example thereof, there is information indicating a relationship between the line width value in the image data and the line width on the printed matter printed by the printing apparatus 108 based on the image data. Then, a method of acquiring the degree of change in the line width in printing by the printing apparatus 108 is explained below. As an example of the acquisition method, mention is made of a method of measuring in advance the line width value after printing as follows. An image in which a plurality of vertical lines whose line width in the main scanning direction is 0.21 mm is arranged at equal intervals and an image in which a plurality of horizontal lines whose line width in the sub scanning direction is 0.21 mm is arranged at equal intervals, which are represented by the image data of the vector data, are printed by the printing apparatus 108 with the print setting of the standard quality of plain paper in the printing apparatus 108. Then, the printed matter on which these images are printed is optically enlarged by a microscope or the like and the enlarged printed matter is acquired as the image data of the printed matter. In a case where the printing apparatus 108 is caused to print lines by using data indicating the same line width as the line width indicated by the image data of the patch image that the target printing apparatus 116 is caused to print, it is possible to directly compare the line widths of the printing results, and therefore, it is possible to omit the processing to perform conversion, and the like. Then, by measuring the number of pixels in the direction corresponding to the line width of the pixels configuring the line on the printed matter, it is possible to estimate the line width value based on the optical enlargement rate and the image capturing resolution of the camera. Further, it may also be possible to estimate the line width value by visual inspection by causing in advance the printing apparatus 108 to print the same patch image as the patch image printed by the target printing apparatus 116. Then, the data of the line width value after printing, which is measured in advance, is stored in the ROM 113 of the printing apparatus 108.

Further, as another method, there is a method of causing the printing apparatus 108 to print the same patch image as the patch image printed by the target printing apparatus 116 at the time of determination of the line width adjustment value. By causing the printing apparatus 108 to print the patch image based on the data of the same patch image as the patch image printed by the target printing apparatus 116, it is possible to measure the line width value after printing in the printing apparatus 108 by using a method similar to the estimation method of the line width value after printing described above. It is possible for a user to select the print setting of the printing apparatus 108, which is used at this time. Because of this, it is possible to perform the line width adjustment with the print setting that a user makes use of most frequently. The estimation method of the relationship between the line width value in the image data and the line width value in the printed matter in the printing apparatus 108 in this case is explained. In a case where, of the plurality of line width detection images in the "vertical" row, the image in which adjacent lines are in contact with each other is only the image in which the lines having a line width of 0.21 mm are arranged with a space of 0.21 mm in between, it is possible to estimate that the line width after printing in the line in the sub scanning direction is 0.42 mm. Then, whether there is an image in which adjacent lines are in contact with each other of the four line width detection images in the "horizontal" row is determined and in a case the adjacent lines are not in contact with each other in all the line width detection images including the image in which the lines having a line width of 0.21 mm are arranged with a space of 0.21 mm in between, it is possible to estimate that the line width after printing in the line in the main scanning direction is 0.21 mm. It is possible to perform the method of causing a user to select and input this to the image processing apparatus similarly as in the case with the target printing apparatus 116.

In a case where the line width adjustment is performed with a plurality of print settings in the printing apparatus 108, the adjustment corresponding to the number of settings with which it is desired to perform the line width adjustment is performed and the line width adjustment values are stored in the ROM 113 of the printing apparatus 108. At this time, the difference between the line width value on the printed matter printed by the printing apparatus 108 and the line width value on the printed matter printed by the target printing apparatus 116 is the line width adjustment value of the printing apparatus 108. For example, it is assumed that the line width value on the printed matter, which is obtained by the printing apparatus 108 printing the line having a line width of 0.21 mm on the image data, is 0.21 mm for the line in the main scanning direction and 0.42 mm for the line in the sub scanning direction. In such a case, the line width adjustment value in the print setting of the standard quality of plain paper of the printing apparatus 108 is 0.21 (=0.42-0.21) mm for the line in the main scanning direction and 0.21 (=0.63-0.42) mm for the line in the sub scanning direction. As above, it is made possible to easily set the line width adjustment value based on the input based on the patch image printed by the target printing apparatus 116 and the characteristic relating to the line width of the printing apparatus 108. It is also possible for the image processing apparatus to input information from a user, which reflects both the line width characteristic of the target printing apparatus 116 and the line width characteristic of the printing apparatus 108, to the image processing apparatus. For example, a correspondence table between the number of each line width detection image of the patch image printed by the target printing apparatus 116 and the number of each line width detection image of the patch image of the printing apparatus 108 as in FIG. 16 is prepared. In the correspondence table, a matrix is indicated that determines one adjustment value from the numbers of each line width detection image selected for the target printing apparatus 116 and the printing apparatus 108. It is also possible for a user to input the selected adjustment value described in the correspondence table to the image processing apparatus and for the image processing apparatus to determine the line width adjustment value of the printing apparatus 108 based on the input adjustment value. It may also be possible to design the correspondence table so that information on the symbol, the number, and the like corresponding to the adjustment value is determined from the selected line width detection image, in place of the adjustment value itself.

Explanation is returned to FIG. 5. At S504, the line width adjustment value of the printing apparatus 108 calculated at step S503 is set to the printing apparatus 108. In a case where the line width adjustment value is calculated by the image processing apparatus 101, the printing apparatus 108 sets the line width adjustment value for matching the line width with that of the target printing apparatus 116 based on the data of the line width adjustment value to be transmitted from the image processing apparatus 101 to the printing apparatus 108. As a method of transmitting data of the line width adjustment value, it may also be possible to use a printer command that is sent to the printing apparatus 108 by the image processing apparatus 101, or it may also be possible to adopt a method of adding the data to print data generated by the image processing apparatus 101. In a case where a printer command is used, or in a case where the line width adjustment value is calculated by the printing apparatus 108, the data of the line width adjustment value is stored in the RAM 112 or the ROM 113 of the printing apparatus 108. The above is the contents of the processing to find the line width adjustment value in the present embodiment.

<About Line Width Correction Processing Using Line Width Adjustment Value>

Figure 9:
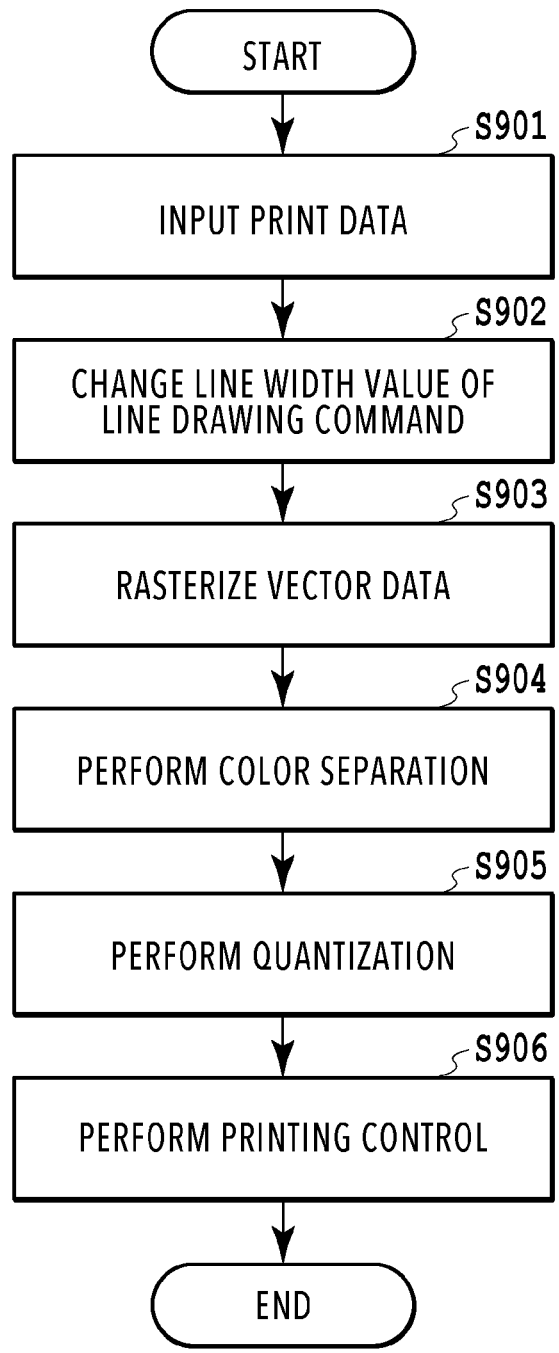
FIG. 9 is a flowchart of printing processing accompanied by line width correction processing in the first embodiment.

In the following, printing processing accompanied by the line width correction processing in the present embodiment is explained by using FIG. 9.

At S901, print data is generated by the image processing apparatus 101. The print data includes data representing an image to be printed and input information on the sheet type, the print quality, the sheet size, the presence/absence of image rotation processing, the layout, and the like. There are a case where the data representing an image to be printed is vector data and a case where the data is raster data. The print data generated by the image processing apparatus 101 is transmitted to the printing apparatus 108 and the print data is input to the printing apparatus 108. In the following, a case where the data representing an image to be printed is vector data is described.

At S902, the CPU 111 of the printing apparatus 108 changes the line width value of the line drawing command of the vector data to be printed based on the line width adjustment value. First, the CPU 111 determines whether the vertical line in the image data is a line in the main scanning direction or a line in the sub scanning direction based on the information indicating the sheet size, the information indicating the presence/absence of image rotation processing, and the layout information, which are included in the print data. Then, in accordance with the determination results, the CPU 111 determines the line width adjustment value for the vertical line and the line width adjustment value for the horizontal line. For example, explanation is given by taking the case (see FIG. 7) described previously where the line width adjustment value for the line in the main scanning direction is 0.21 mm and the line width adjustment value for the line in the sub scanning direction is 0.21 mm as an example. In this case, on a condition that it is determined that the vertical line is a line in the main scanning direction at S902, the line width adjustment value for the vertical line is 0.21 mm and the line width adjustment value for the horizontal line is 0.21 mm.

Figure 10:
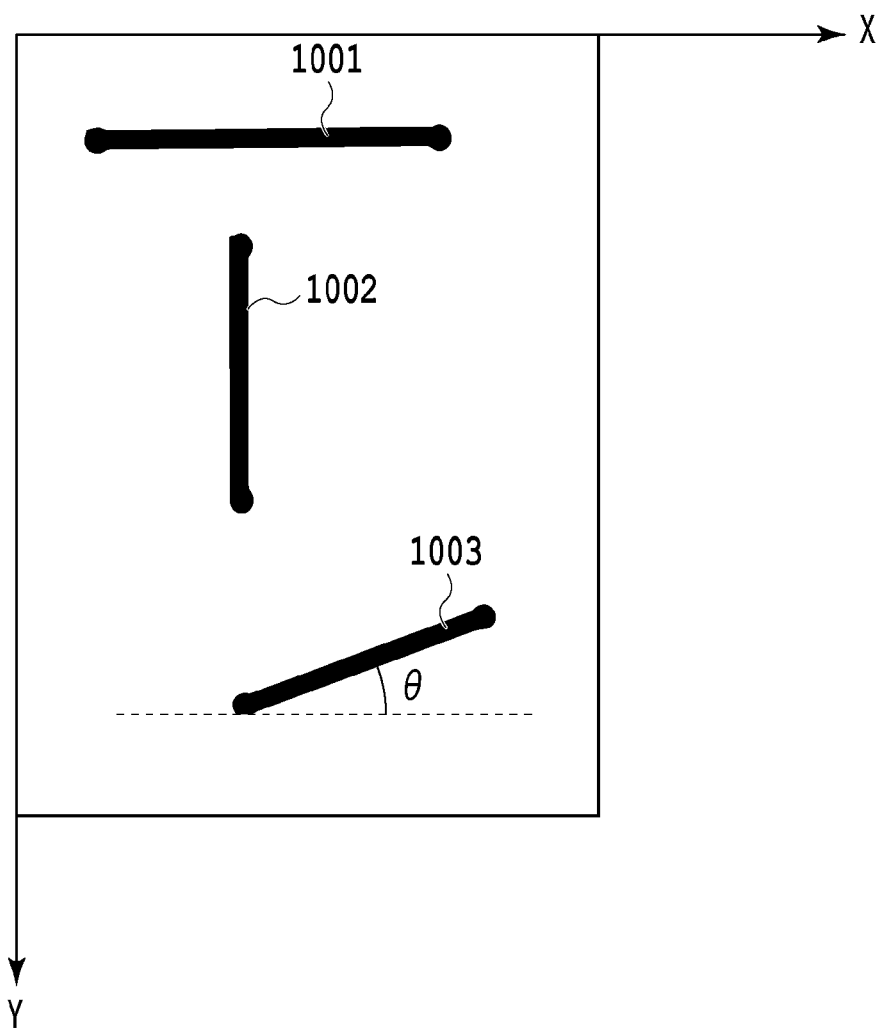
FIG. 10 is a diagram showing a calculation example of a line width adjustment value in the first embodiment.

Here, processing to determine whether the line within the vector data is a vertical line or a horizontal line is explained by using FIG. 10. The data representing an image to be printed is vector data, and therefore, coordinates of the start point and the end point of the line are specified. In a case where the Y-coordinate of the start point and that of the end point are the same as in a line 1001, it is determined that the line is a horizontal line and in a case where the X-coordinate of the start point and that of the end point are the same as in a line 1002, it is determined that the line is a vertical line. At this time, the X-coordinate or the Y-coordinate of the start point does not need to be the same as the X-coordinate or the Y-coordinate of the end point. Alternatively, in place of using the X-coordinates or the Y-coordinates of the start point and the end point, it may also be possible to calculate the angle indicating the slope of the line from the positions of the start point and the end point and determine whether the line is a vertical line or a horizontal line based on the calculated angle. For example, it is determined that the line having one value in a range not more than 100 degrees and not less than 80 degrees or in a range not less than 260 degrees and not more than 280 degrees, with the X-axis being taken to be 0 degrees, as an angle is a vertical line and the line having one value in a range not less than −10 degrees and not more than 10 degrees or in a range not less than 170 degrees and not more than 190 degrees as an angle is a horizontal line. Alternatively, it may also be possible to use a correction value changed from the line width adjustment value described previously depending on the angle. In the case such as this, it is possible to calculate a correction value C1 of a line by equation (1) below by taking the line width adjustment value of the vertical line as Cv, the line width adjustment value of the horizontal line as Ch, and the angle of the line in a case where the X-axis is taken to be 0 degrees as θ.

[Mathematical equation 1]

$$C1 = Cv \times \sin(\theta) + Ch \times \cos(\theta) \qquad \text{equation (1)}$$

The line width adjustment is performed by calculating the line width adjustment value of the drawing-target line and adding the calculated line width adjustment value to the line width value of the vector data.

At S903, the CPU 111 or the image processing accelerator 109 rasterizes the vector data by using an already-known method. At S904, the CPU 111 or the image processing accelerator 109 performs the color conversion processing described previously. At S905, the CPU 111 or the image processing accelerator 109 performs the quantization processing described previously. At S906, the printing control described previously is performed, which includes print data transmission to the print head 115 by the print head controller 114, drive of the carriage motor and the conveyance motor by the CPU 111, and the like.

By performing the above processing, it is possible to calculate the line width adjustment value based on the line width detection image printed by the target printing apparatus 116 and easily acquire the results of printing by the printing apparatus 108 for which the line width adjustment has been performed in accordance with the calculated line width adjustment value. Further, it is made possible to calculate the line width adjustment value for each of the line in the main scanning direction and the line in the sub scanning direction and calculate the line width adjustment value based on the angle of the line, and it is made possible to acquire the results of printing by the printing apparatus 108 for which the optimum line width adjustment has been performed both in the main scanning direction and in the sub scanning direction. Furthermore, it is possible to adjust the line width value in the vector data, and therefore, it is made possible to perform fine adjustment.

Each of the line width detection images shown in FIG. 6 is the image including only the black lines and the image for detecting the line width of the black line, but it may also be possible to include an image including color lines, such as red lines and blue lines, as the line width detection image. In this case, the processing described previously is performed in accordance with the color of the line and the line width adjustment value is calculated for each color of the line. At the time of line width adjustment, the color information within the line drawing command is referred to and the line width adjustment value is switched to another in accordance with the color. By doing so, it is made possible to acquire printing results for which the optimum line width adjustment has been performed for each color.

In the above, the line width is adjusted by changing the line width value of the vector data, but it is possible to perform line width adjustment processing for the raster data by performing the filtering process after rasterization. The processing such as this is processing effective also in a case where the print data is raster data.

Figure 11C:
FIG. 11A to FIG. 11F are each a diagram showing an expansion filter in the first embodiment.
Figures 11A, 11B:
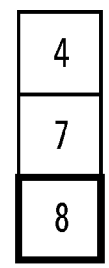
Figure 11F:
Figures 11D, 11E:
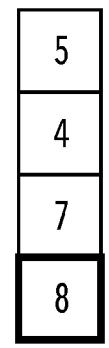
Figures 12A, 12B, 12C:
FIG. 12A to FIG. 12F are each a diagram showing a reduction filter in the first embodiment.
Figures 12D, 12E, 12F:
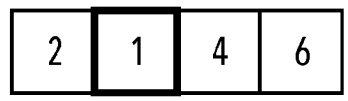

First, an one embodiment of the line width correction processing for raster data, a case where an expansion filter to increase the line width is used is explained by using FIG. 11A to FIG. 11F. Each filter shown in FIG. 11A to FIG. 11F is a maximum value filter, which is one kind of expansion filter. The maximum value filter is a filter whose maximum value within the filter is taken to be the output value. In a case where a 3×3 filter shown in FIG. 11A is applied, the line width increases and specifically, a one-pixel line becomes a three-pixel line. By increasing the filter size as in FIG. 11D, it is possible to control the number of pixels of the line width for increasing the line width. For example, in a case where the line width adjustment value is 0.21 mm, the processing to increase the line width by an amount corresponding to one pixel is performed by using a 2×2 filter. Further, in a case where different line width adjustment values are applied to the vertical line and the horizontal line, it is sufficient to use a filter whose number of pixels is different between the vertical direction and the horizontal direction, such as a 2×3 filter. Furthermore, it may also be possible to perform the filtering process separately in the vertical direction and in the horizontal direction. For example, by using a 3×1 filter as in FIG. 11B and a 1×4 filter as in FIG. 11F, it is possible to apply the line width adjustment different between the vertical line and the horizontal line. Further, by performing the filtering process separately in the vertical direction and in the horizontal direction, it is possible to simplify the filter calculation processing, and therefore, it is made possible to implement a high-speed filtering process.

As one embodiment, processing in a case where raster data is represented by using the sRGB color space is explained. In the sRGB color space, the pixel value of a white pixel is (R, G, B)=(255, 255, 255). Because of this, it is assumed that the filtering process-target value is the distance from the point at the coordinates (255, 255, 255) in the sRGB color space. Among the pixels within the filter, the pixel whose distance is the maximum is the output pixel. In a case where the pixel value is taken to be (R1, G1, B1), it is possible to calculate the distance (referred to as L) by using equation (2) below.

[Mathematical equation 2]

$$L^2 = (R1\text{-}255)^2 + (G1\text{-}255)^2 + (B1\text{-}255)^2 \qquad \text{equation (2)}$$

In equation (2), the square root is not calculated. The reason is that it is only required to know the magnitude relationship of the values within the filter for the maximum value filter, and therefore, it is not necessary to calculate the square root. By not calculating the square root, it is possible to reduce the amount of calculation and increase the speed of the filtering process.

Further, there is a case where an image having gradation, such as a natural image and a graphic, is included in the drawing data. In this case, on a condition that the filtering process is performed uniformly, the filtering process is also applied to the gradation, and therefore, this may be a cause of deterioration in image. Because of this, in a case where the pixel values of the pixels other than the white pixels within the filter are not the same, it may also be possible to perform processing to determine whether to output the pixel value of the original image in place of the pixel value after the filtering process. By performing the determination processing such as this, it is made possible to apply the filtering process only to the line because the line drawn in the drawing has the same color. Because of this, it is possible to suppress deterioration in image of gradation of a natural image, a graphic, and the like.

Next, as one embodiment of the line width correction processing for raster data, a case where a reduction filter to reduce the line width is used is explained by using FIG. 12A to FIG. 12F. Each filter shown in FIG. 12A to FIG. 12F is a minimum value filter, which is one kind of reduction filter. The minimum value filter is a filter whose minimum value within the filter is taken to be the output value. In a case where the reduction filter is used, there is a possibility that the line disappears, and therefore, in a case where the reduction filter is used, it is necessary to perform processing to prevent the number of pixels not the white pixels within the filtering-target pixels from becoming less than or equal to a predetermined number. Specifically, in a case where the minimum value filter is a 3×3 filter, processing is performed so that three pixels, not white pixels, of nine pixels are left. Further, in a case where it is desired to apply line width adjustment different between the vertical line and the horizontal line, it is sufficient to perform the same processing as that of the expansion filter described previously.

By performing the above processing, it is made possible to perform line width adjustment also for raster data. Further, by performing the filtering process for raster data, it is made possible to perform line width adjustment also for a line other than a straight line, such as a curve and a circle.

It may also be possible to perform the filtering process described previously for the data after the color conversion at S904. By doing so, it is made possible to perform line width adjustment for each ink color, and therefore, it is made possible to perform line width adjustment that takes into consideration the blurring ratio on the paper surface depending on the characteristic, such as the ink viscosity and the color material density. In this case, in the line width detection image to be printed, an image including the lines of the same ink color is included.

<About Specific Example of Line Width Detection Processing>

Figure 13A:
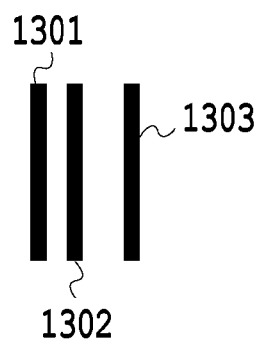
FIG. 13A to FIG. 13D are each a diagram schematically showing a simplest line width detection image in the first embodiment.

In the following, a specific example of the line width correction processing in the present embodiment is explained by using FIG. 13A to FIG. 13D. FIG. 13A is a diagram showing the simplest line width detection image and this line width detection image includes three vertical lines. As shown in FIG. 13A, the interval (also referred to as inter-line distance) between a line 1301 and a line 1302 and the interval between the line 1302 and a line 1303 are different. Here, as an example, it is assumed that the line width of the line 1301 to the line 1303 is 0.21 mm, the interval between the line 1301 and the line 1302 is 0.42 mm, and the interval between the line 1302 and the line 1303 is 0.84 mm.

Figure 13B:
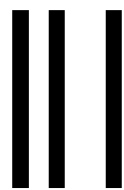
Figure 13C:
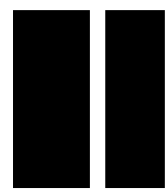
Figure 13D:
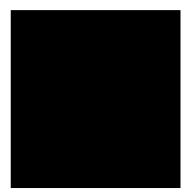

In a case where the line width detection image shown in FIG. 13A is printed, it is possible to detect each state as shown in FIG. 13B to FIG. 13D. From the state shown in FIG. 13B, it is possible to estimate that the line width value after the printing is less than 0.42 mm because the line 1301 and the line 1302 do not adhere to each other and the line 1302 and the line 1303 do not adhere to each other. From the state shown in FIG. 13C, it is possible to estimate that the line width value after the printing is not less than 0.42 mm and less than 0.84 mm because the line 1301 and the line 1302 adhere to each other and the line 1302 and the line 1303 do not adhere to each other. From the state shown in FIG. 13D, it is possible to estimate that the line width value after the printing is more than or equal to 0.84 mm because the line 1301 and the line 1302 adhere to each other and the line 1302 and the line 1303 adhere to each other. As described above, by using the line width detection image as in FIG. 13A, it is possible to easily detect the relationship between the line width of the original print data and the line width on the printed matter while suppressing consumption of ink and sheets.

The intervals between the lines do not need to be the two patterns as in FIG. 13A. By providing more patterns, it is possible to improve the accuracy of detection of the line width value after the change. Further, each line width detection image may be configured by only the lines whose intervals between the lines are equal like the patch image shown in FIG. 6. By doing so, it is possible to make easier the determination of whether or not the lines adhere to each other in a case where the determination is performed by visual recognition by a user. Further, by setting the interval between lines to within a certain range, it is also made possible to automatically determine whether lines adhere to each other by using a scanner, a colorimeter, and a sensor, such as a density sensor. By taking the results of the automatic determination as the results at S502, the determination by visual recognition is no longer necessary, and therefore, it is made possible to adjust the line width more easily.

<About Effect of the Present Embodiment>

According to the present embodiment, it is made possible for a user to easily set the line width adjustment value for matching the line widths on the printed matter printed by a plurality of printing apparatuses based on the same image data.

Second Embodiment

In the first embodiment, under the print condition other than the print condition by which the line width adjustment value is calculated, the matching accuracy of the line width is reduced. Further, in a case where an attempt is made to improve the matching accuracy of the line width, a work troublesome to a user becomes necessary, such as setting of the adjustment value for each print condition. In the present embodiment, in order to address the problem such as this, the rate of change in the line width adjustment value is determined by using a table. In the following, differences from the already-described embodiment are explained mainly and explanation of the same contents as those of the already-described embodiment is omitted appropriately.

<About Line Width Correction Processing>

Figure 14:
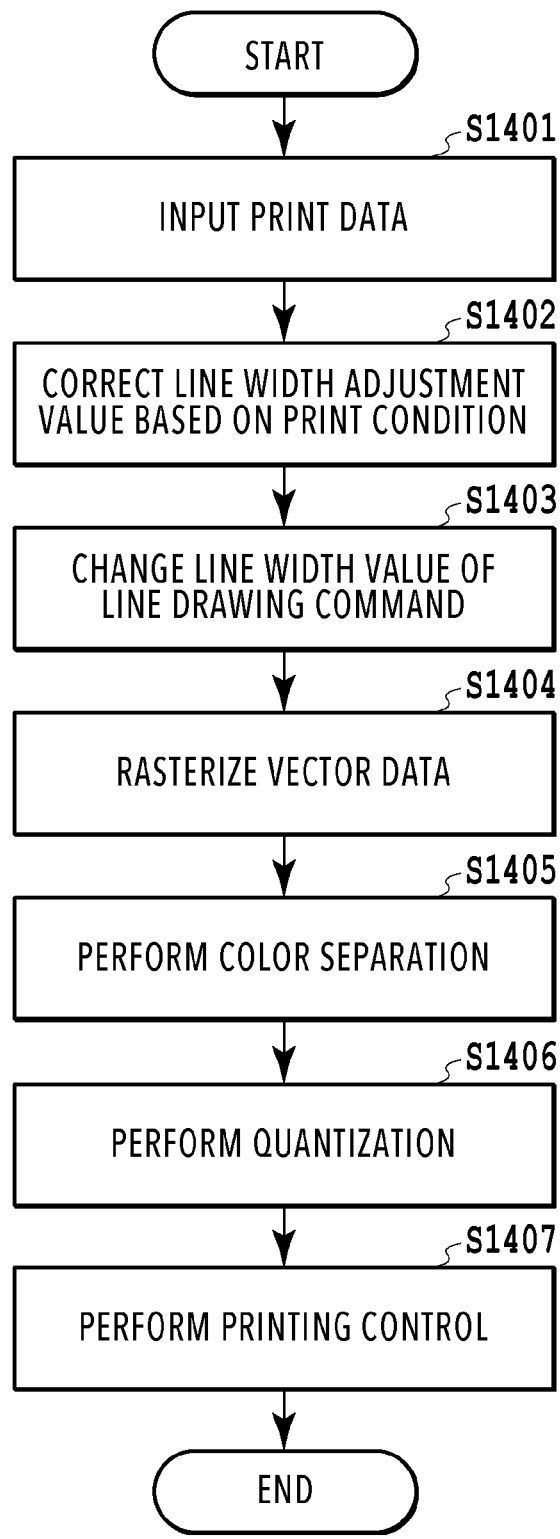
FIG. 14 is a flowchart of printing processing accompanied by line width correction processing in a second embodiment.

In the following, the line width correction processing in the present embodiment is explained by using FIG. 14.

S1401 is the same as S901 (see FIG. 9) in the first embodiment.

At S1402, the CPU 111 corrects the line width adjustment value based on the print condition included in the print data that is input at step 1401. The line width adjustment value corrected at this step is called the corrected line width adjustment value. The print conditions used at this step is the sheet type and the print quality.

FIG. 15A shows an example of a table used at S1402. By storing in advance the table as shown in FIG. 15A storing a relationship between the sheet type, the print quality, and the scan speed in the ROM 113 and by the CPU 111 referring to the table such as this at S1402, the scan speed of the print head 115 is determined. The higher the scan speed, the larger the distance between the landing position of the main droplet and the landing position of the satellite and the landing error of the main droplet become, and therefore, the line width increases.

Further, in the ROM 113, a table storing a relationship between the scan speed of the print head 115, the rate of change in the main scanning direction, and the rate of change in the sub scanning direction as illustrated in FIG. 15C is stored in advance. After finding the scan speed by referring to the table in FIG. 15A, the rate of change in the line width adjustment value corresponding to the scan speed is determined by referring to the table in FIG. 15C. The scan speed affects the distance between the landing position of the main droplet and the landing position of the satellite, but the degree of the influence is different between the main scanning direction and the sub scanning direction, and therefore, the rate of change in the main scanning direction and the rate of change in the sub scanning direction corresponding to each scan speed are different as shown in FIG. 15C.

Further, the degree of blurring of a dot on the paper surface changes depending on the sheet type. Because of this, by storing in advance the table as illustrated in FIG. 15B in the ROM 113 and referring to the table such as this, the rate of change in accordance with the sheet type is determined. The degree of blurring of a dot does not change between the main scanning direction and the sub scanning direction. Consequently, the rate of change for each sheet type is a value that does not depend on the scanning direction as shown in FIG. 15B.

As one embodiment, it is possible to find the rate of change by calculating a ratio between the line width under a predetermined print condition and the line width under another print condition. For example, it may also be possible to calculate a ratio between the line width under a print condition by which the printing apparatus 108 can print the thinnest line and the line width under another print condition as the rate of change. The line width adjustment value is corrected by multiplying the line width adjustment value by the rate of change that depends on the degree of dot blurring and the rate of change that depends on the print head speed. Specifically, in a case where the line width adjustment value is taken as C1, the rate of change that depends on the degree of dot blurring as Cd, and the rate of change that depends on the print head speed as Cc, a corrected line width adjustment value C2 is calculated by using equation (3) below.

[Mathematical equation 3]

$$C2 = C1 \times Cd \times Cc \qquad \text{equation (3)}$$

S1403 to S1407 are the same as S902 to S906 (see FIG. 9) in the first embodiment. The above is the contents of the line width correction processing in the present embodiment.

<About Effect of the Present Embodiment>

According to the present embodiment, even in a case where a user changes a print condition, an adjustment value is corrected so as to be suitable to the changed print condition, and therefore, it is not necessary for a user to perform a work to match the line width adjustment value.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present disclosure, it is made possible for a user to easily set an adjustment value for adjusting line widths on printed matter printed by a plurality of printing apparatuses respectively based the same image data.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2018-182954, filed Sep. 27, 2018 and No. 2019-144469, filed Aug. 6, 2019, which are hereby incorporated by reference herein in their entirety.

What is claimed is:

1. An information processing apparatus comprising:
one or more processors and at least one memory, wherein the one or more processors according to instructions stored in the at least one memory is configured to function as:
 a first acquisition unit configured to acquire first information relating to printed matter including a first plurality of patches printed by a first printing apparatus, wherein in each of the first plurality of patches, a plurality of lines having a predetermined width in a first direction and extending in a second direction intersecting the first direction is provided at substantially equal intervals in the first direction, and wherein the first plurality of patches includes a first patch and a second patch, and a first substantially equal interval between the plurality of lines included in the first patch is different from a second substantially equal interval between the plurality of lines included in the second patch;
 a second acquisition unit configured to acquire second information indicating a relationship between a width of a line in predetermined print data and a width of a line in printed matter that is printed by a second printing apparatus based on the predetermined print data; and
 a determination unit configured to determine an adjustment value for adjusting a width of a line, which is used in a case where data that is printed by the first printing apparatus is processed, based on the first information and the second information.

2. The information processing apparatus according to claim 1, further comprising:
 a transmission unit configured to transmit data of the adjustment value to the second printing apparatus, wherein
 the transmission unit transmits data of the adjustment value to the second printing apparatus by using a printer command or by adding a printer command to the print data that is generated by the information processing apparatus.

3. The information processing apparatus according to claim 1, wherein
 the second printing apparatus comprises at least one processor coupled to a memory, serving as a setting unit configured to set the adjustment value based on data of the adjustment value transmitted from the information processing apparatus.

4. The information processing apparatus according to claim 3, wherein
 in the print data, coordinates of a start point and an end point of a drawing-target line are specified, and
 the one or more processors according to instructions stored in the at least one memory is further configured to function as a correction unit configured to correct the adjustment value set by the setting unit in accordance with an angle of the drawing-target line.

5. The information processing apparatus according to claim 3, wherein
 the at lest one processor coupled to the memory is further configured to function as a changing unit configured to change a value indicating a line width included in the print data based on the adjustment value set by the setting unit.

6. The information processing apparatus according to claim 5, wherein
 print data includes print conditions specifying a sheet type and print quality, and
 the at least one processor to the memory is further configured to function as a first determination unit configured to determine a scan speed of a print head in accordance with print conditions.

7. The information processing apparatus according to claim 6, wherein
 the at least one processor coupled to the memory is further configured to function as:
  a second determination unit configured to determine a rate of change in the adjustment value corresponding to a sheet type specified by the print condition;
  a third determination unit configured to determine a rate of change in the adjustment value corresponding to the scan speed; and
  a correction unit configured to correct the adjustment value set by the setting unit based on a rate of change determined by the second determination unit and a rate of change determined by the third determination unit.

8. The information processing apparatus according to claim 1, wherein
 the first acquisition unit further acquires third information relating to printed matter including a second plurality of patches printed by the first printing apparatus, wherein in each of the second plurality of patches, a plurality of lines having a predetermined width in the second direction and extending in the first direction is provided at substantially equal intervals in the second direction, and wherein the second plurality of patches includes a third patch and a fourth patch, and a third substantially equal interval between the plurality of lines included in the third patch is different from a fourth substantially equal interval between the plurality of lines included in the fourth patch, and the determination unit determines the adjustment value corresponding to the second printing apparatus based further on the third information.

9. The information processing apparatus according to claim 8, wherein the determination unit determines the adjustment value for each of a line extending in the first direction and a line extending in the second direction.

10. The information processing apparatus according to claim 1, wherein the first information is information indicating at least one patch in which two lines adjacent in the first direction adhere to each other of a plurality of patches printed by the first printing apparatus.

11. The information processing apparatus according to claim 1, wherein the first information is information indicating all patches in which two lines adjacent in the first direction adhere to each other of a plurality of patches printed by the first printing apparatus.

12. The information processing apparatus according to claim 1, wherein the first information is information indicating one patch whose interval between two adjacent lines is the largest of patches in which two lines adjacent in the first direction adhere to each other.

13. The information processing apparatus according to claim 1, wherein the first information is information indicating one patch whose interval between two adjacent lines is the largest of patches in which two lines adjacent in the first direction adhere to each other and one patch whose interval between two adjacent lines is the smallest of patches in which two lines adjacent in the first direction do not adhere to each other.

14. The information processing apparatus according to claim 1, further comprising:

an input unit configured to receive the first information from a user, wherein the acquisition unit acquires the first information from the input unit.

15. The information processing apparatus according to claim 1, further comprising:

a display unit configured to produce a display for prompting a user to input the first information.

16. The information processing apparatus according to claim 1, wherein in the first patch, an interval between a first line and a second line adjacent in the first direction is equal to an interval between the second line and a third line adjacent in the first direction, and wherein in the second patch, an interval between a fourth line and a fifth line adjacent in the first direction is equal to an interval between the fifth line and a sixth line adjacent in the first direction.

17. A method comprising:

a step of acquiring first information relating to an output in a case where printed matter including a first plurality of patches is printed by a first printing apparatus, wherein in each of the first plurality of patches, a plurality of lines having a predetermined width in a first direction and extending in a second direction intersecting the first direction is provided at substantially equal intervals in the first direction, and wherein the first plurality of patches includes a first patch and a second patch, and a first substantially equal interval between the plurality of lines included in the first patch is different from a second substantially equal interval between the plurality of lines included in the second patch;

a step of acquiring second information indicating a relationship between a width of a line in predetermined print data and a width of a line in printed matter that is printed by a second printing apparatus based on the predetermined print data; and a step of determining an adjustment value for adjusting a width of a line, which is used in a case where data that is printed by the first printing apparatus is processed, based on the first information and the second information.

18. A non-transitory computer readable storage medium storing a program for causing a computer to perform a method, the method comprising:

a step of acquiring first information relating to an output in a case where printed matter including a first plurality of patches is printed by a first printing apparatus, wherein in each of the first plurality of patches, a plurality of lines having a predetermined width in a first direction and extending in a second direction intersecting the first direction is provided at substantially equal intervals in the first direction, and wherein the first plurality of patches includes a first patch and a second patch, and a first substantially equal interval between the plurality of lines included in the first patch is different from a second substantially equal interval between the plurality of lines included in the second patch;

a step of acquiring second information indicating a relationship between a width of a line in predetermined print data and a width of a line in printed matter that is printed by a second printing apparatus based on the predetermined print data; and a step of determining an adjustment value for adjusting a width of a line, which is used in a case where data that is printed by the first printing apparatus is processed, based on the first information and the second information.

* * * * *